April 28, 1936.  C. L. CALARCO ET AL  2,038,883

BRAKE CONTROL APPARATUS

Filed July 15, 1935

INVENTORS
CARMINE L. CALARCO
GENE LEOFANTI
BY
Joseph F. Padlon
Their ATTORNEY.

Patented Apr. 28, 1936

2,038,883

UNITED STATES PATENT OFFICE 2,038,883

BRAKE CONTROL APPARATUS

Carmine L. Calarco, New York, and Gene Leofanti, Staten Island, N. Y.

Application July 15, 1935, Serial No. 31,348

12 Claims. (Cl. 192—13)

This invention relates to brake control apparatus, and more particularly to a brake control linkage device for use in motor vehicles.

In many cities, motor traffic very often becomes congested, and as a result operators must drive their vehicles either slowly or at short intervals. This requires continual braking and shifting, and in cases where traffic is stopped on a hilly street the operator finds it difficult to keep his foot on the brake and at the same time properly shift. Furthermore, continual pressure on the brake pedal of the vehicle causes a strain on the driver's leg making it awkward for him to properly shift gears in the operation of the vehicle.

It is an object of the present invention to provide a simply constructed and easily assembled brake control device for use in connection with motor vehicles.

It is another object of the present invention to provide novel apparatus for attachment to the brake and clutch pedals of motor vehicles to control the operation of the foot brake when the motor vehicle is to be started when at rest on a level or inclined grade, thereby permitting the operator to rest his legs.

One other object of this invention is to provide control apparatus for retaining the foot brake of a motor vehicle in depressed position and for automatically releasing said foot brake upon the operation of the clutch pedal.

Still another object of the present invention is to provide brake control apparatus with means for easily disengaging the apparatus from operation with the brake and clutch pedals of a motor vehicle.

These and other objects will become apparent from the embodiment described and claimed herein.

Figure 1:
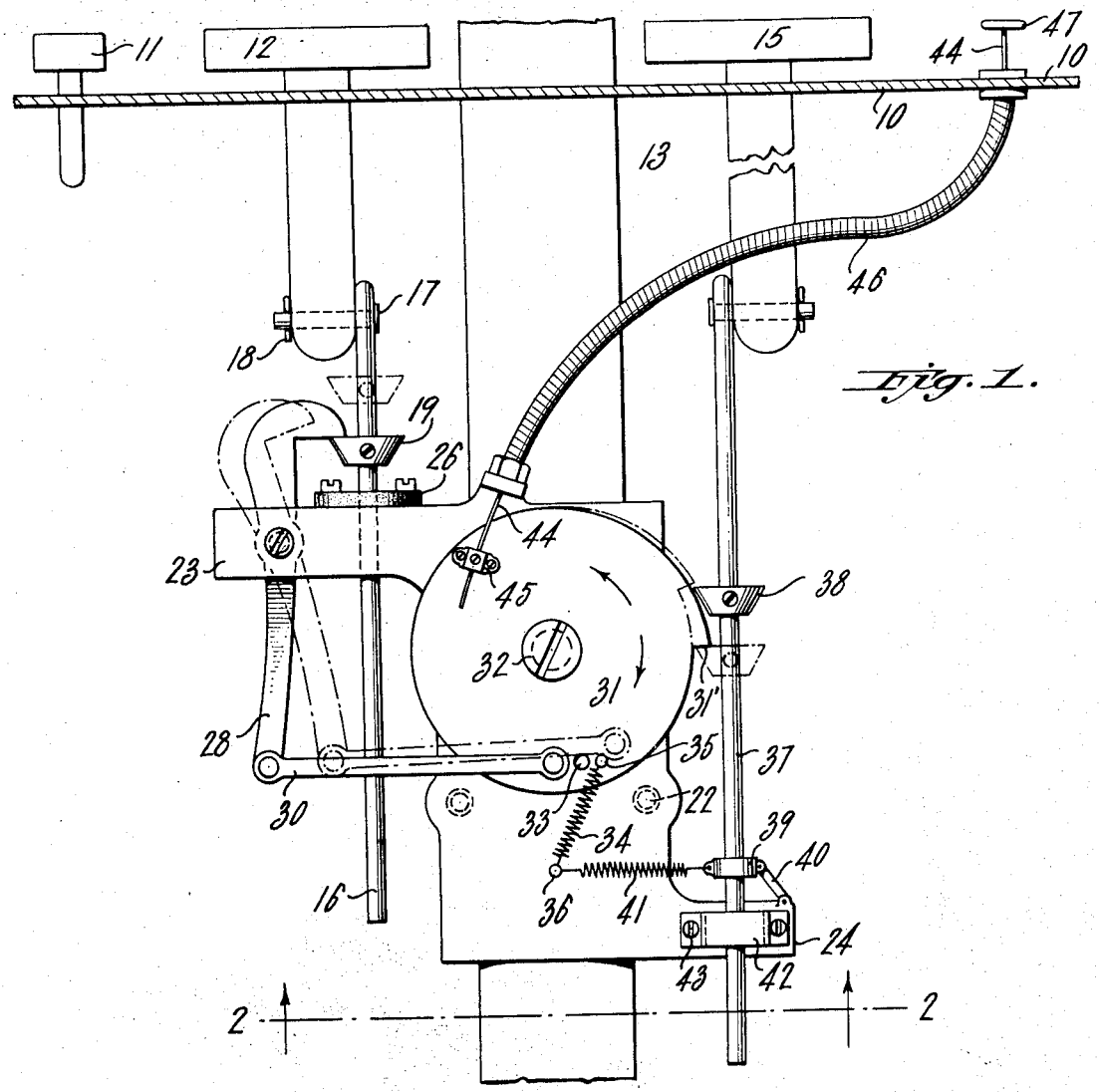
Figure 2:
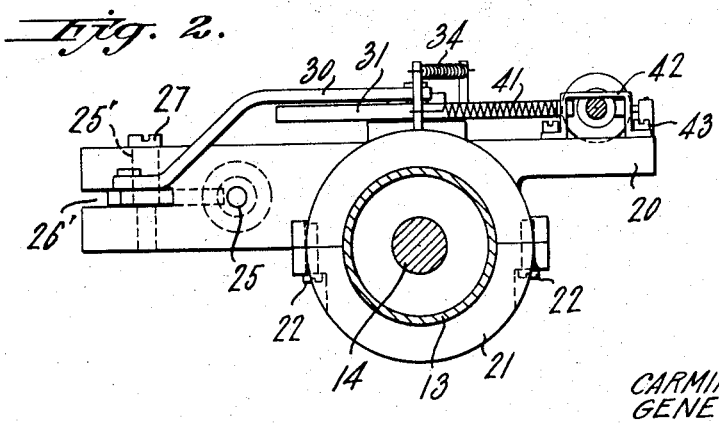

In the accompanying drawing is shown a preferred embodiment of the present invention, in which:

Fig. 1 is a plan view of the preferred construction embodying the present invention; and Fig. 2 is a section looking in direction of arrows taken on line 2—2 of Fig. 1.

Referring now more particularly to the drawing in which similar reference characters designate like parts thruout, a conventional dash and floor board 10, has passing thru it an accelerator button 11, brake pedal 12, a steering wheel shaft casing 13, for steering shaft 14, and a clutch pedal 15. Said clutch, pedal and steering members may be of any conventional type. Brake pedal 12 is pivoted to a rod member 16 by a cross pin 17 and is held in engagement by means of a cotter 18. Said rod is carried back and forth by the brake pedal when the latter is actuated, and is provided with an adjustably mounted detent 19, preferably of frusto-conical outline.

Steering rod casing, 13 is provided with bracket members 20 and 21, which are held in any desired adjustable position by means of fastening members 22. Bracket member 20 has a pair of diagonally opposed angular extensions 23 and 24 respectively. Extension 23, is provided with an opening, 25 for maintaining rod 16 in alignment during the movement of the brake pedal. One end of opening 25 is provided with a washer 26 made of any resilient material to prevent contact of detent 19 with extension 23 on the downward movement of brake pedal 12. Said washer also takes up the shock against extension 23 caused by detent 19 being rapidly moved downward during the operation of the brake pedal.

Extension 23, furthermore, has a longitudinal slot 26', as shown in Fig. 2, thru which is passed a set screw pin 27, for pivotally accommodating a hook bar 28. Said pin extends thru openings 25' in extension 23 and an opening 26' at the hooked end portion of bar 28. The upper end of the bar as shown in the drawing is adapted to form a sliding and fixed engagement with the longer end of detent 19, every time said bar is actuated and the hooked end is moved toward said detent. The other end of bar 28 is pivotally connected to one end of a link member 30 to permit movement of the bar about pin 27. Said link member 30 is pivoted at its other end to a ratchet wheel 31 adjacent its periphery. Said wheel is provided with a plurality of successive openings, 33 for adjustment of the link member with the wheel, in order to get the desired engagement of the hook bar 28 with detent 19.

Ratchet wheel 31 is provided with one or more tangentially extended ends or teeth 31' and is mounted flush on the face of bracket 20, being rotatably engaged thereon by means of fastening member 32. Ratchet wheel 31 is normally retained in a tensed clockwise position by means of a spring 34 interconnecting the wheel and bracket 20, thus normally keeping hook bar 28 in engagement with detent 19. Spring 34 is held in position by means of pins 35 and 36 on the wheel and bracket member respectively.

Clutch pedal 15 shown as broken away in Fig. 1 has a pivotally extending rod 37 onto which is adjustably mounted a detent 38 similar in construction to detent 19. Rod 37 is retained in position during its movement by a collar 39 thru which it passes, when detent 38 makes abutting contact with tooth 31'. Said collar is held in position by strut 40 pivoted to the marginal edge of extension 24, and a tension spring 41. Said spring is connected at one end to pin 36 on bracket 20. It is to be noted that every time rod 37 is moved laterally of bracket 20, spring 41 is yieldably extended to permit such movement. A brace 42 is fixed to the face of extension 24 as shown in the drawing by means of screw bolts 43, to limit the lateral movement of rod 37 during the operation of clutch pedal 15.

If it is desired to keep ratchet wheel 31 in inoperative position, a cable 44 is provided. Said cable is pivoted at one end to the face of wheel 31 by means of attachment 45, and extends therefrom thru a casing 46 to board 10. The other end of the cable extending from board 10, has a handle 47 to permit pushing or pulling of the same, thereby moving ratchet wheel in clockwise or counterclockwise direction. Furthermore, said handle 47 may be rotated in any suitable manner to lock the cable thereby keeping ratchet wheel 31 in an inoperative position when the brake control device is not used.

In the operation of the embodiment, hereinabove described, when pedal 12 is depressed, rod 16 is brought down therewith. Detent 19 on said rod forms a slidable abutment on the curved upper end of bar 28, forcing the upper part of the bar outwardly as shown in Fig. 1 of the drawing. Spring 34 of wheel 31 moves the latter clockwise thereby effecting engagement of the bar with the detent. It is to be noted that when the brake pedal is in locked position, tooth 31' of wheel 31 is in the position shown in full line in Fig. 1.

To release the engagement, clutch pedal 15 is depressed, detent 38 on rod 37 slides over the periphery of wheel 31. Rod 37 being loosely pivoted at its end to pedal 15 permits detent 38 to pass over the edge of tooth 31', and is then brought into alignment by means of spring 41. The detent then engages tooth 31 as shown in the drawing. Clutch pedal 15 normally rising draws up with it rod 37 and detent 38 which rotates wheel in counterclockwise position to break the engagement of hook bar 28 with detent 19, to release the brake pedal which moves upward.

It is apparent from the preceding description taken in connection with the accompanying drawing that a novel invention is attained having many advantages heretofore not found in the prior art. According to the present invention, the foot brake of a motor vehicle can be easily retained in depressed position, when the vehicle is on an inclined grade, by first putting ratchet wheel 31 in operative position, namely by turning it in a clockwise direction. Said wheel in turn horizontally shifts link member 30 to the left of the device as shown in the drawing. The upper part of hook bar 28, which is pivoted at its upper portion to extension 23 of bracket 20 can easily engage detent 19 on its downward movement on the foot brake rod. By merely depressing the clutch pedal, the locking engagement is broken and the vehicle is ready to move. Furthermore, it is to be noted that the motor operator is relieved of the awkwardness caused by continually keeping his foot on the brake when the vehicle is on an inclined grade.

While one preferred embodiment of this invention has been described it is to be understood that various changes as to parts, materials, use and form may be made without departing from the spirit of the invention as hereinafter claimed.

We claim:
1. Brake control apparatus comprising a brake pedal, a clutch pedal, a mountable bracket intermediate the pedals, a rotatable catch member on said bracket, a linkage member pivotally extending from the catch member, pivotal means in connection with the linkage member for retaining the brake pedal in fixed position, and interlocking means on the pedals for controlling the rotary movement of the catch member.

2. Brake control apparatus comprising a clutch pedal, a brake pedal, slidable means pivotally extending from said pedals, a longitudinal casing intermediate said pedals and means, a bracket mounted on the casing, having diagonally opposite extensions thereon for accommodating the passage therethru, of said slidable means, a rotatable tensed member on the bracket having a marginal extending portion, a slidably adjustable locking member on each of said slidable members, a link extending from said rotatable member, and means intermediate the link and the slidable means on the brake pedal for engaging the locking member on said brake pedal slidable means.

3. Brake control device for a motor vehicle comprising a bracket, having a pair of diagonally opposed extensions, a ratchet wheel mounted on said bracket intermediate the extensions, a pair of slidable members for said extensions, catching means slidably adjusted on the members, a locking member pivoted to one of the extensions for engaging the catching means on one of the slidable members, a linkage member interconnecting the locking member and the ratchet wheel, and means for normally retaining the ratchet wheel in tensed position.

4. A brake control device according to claim 3, in which one of the catching means is adapted to engage the ratchet wheel and normally disengage the locking member from the catching means of the other slidable member.

5. Apparatus for controlling the foot brake of a motor vehicle comprising, a brake pedal, a clutch pedal, a steering rod casing intermediate the pedals, a rod pivoted to each of said pedals, catching means on the rods adjustably mounted thereon, a bracket fixed to the casing having opposed extensions thereon, one of said extensions having a slotted opening, and an adjacent opening therein, said opening accommodating the brake rod, a ratchet wheel, rotatably mounted on the bracket intermediate the extensions, the catching means on the clutch pedal rod being adapted to engage the ratchet wheel, a locking member pivoted to the slotted extension for normally engaging the catching means on the brake rod, a linkage member interconnecting the locking member with the ratchet wheel whereby the latter may actuate the locking member, and a tensioned spring extending from the bracket to the ratchet wheel for retaining the ratchet wheel in tensed clockwise position.

6. Brake control apparatus for motor vehicles, according to claim 5, in which the ratchet wheel is provided with flexible means extending therefrom to the dashboard of the motor vehicle to render the wheel inoperable.

7. Brake control apparatus for motor vehicles including a bracket with opposed extensions thereon, means for supporting the bracket, a brake rod and a clutch rod, accommodated by said extensions, adjustable catch means on each of said rods, a rotary member mounted on said bracket engageable with the clutch rod means, a locking member pivoted to one of said extensions for normally engaging the catch means on the brake rod, linkage means interconnecting the locking member and the ratchet wheel whereby to release the locking member from engagement, tension means intermediate the ratchet and rotary member for normally retaining the latter in tensed clockwise condition, and tension means intermediate the bracket and clutch rod for permitting lateral engagement of the catching means on the clutch rod thereby permitting movement of the rotary member in counterclockwise direction to disengage the locking member.

8. Brake control device for motor vehicles comprising a bracket, means for supporting said bracket, a rotatable engaging member on said bracket, tension means interconnecting the rotatable member and the bracket tending to keep the member in tensed clockwise position, a clutch pedal, a brake pedal, a pivotal locking member mounted on the bracket, a linkage member interconnecting the rotatable and locking members, means extending from the brake pedal for interlocking the locking member, and means extending from the clutch pedal for actuating the rotatable member and disengage the locking member from the brake pedal extending means.

9. A brake control device according to claim 8, provided with manually controllable tractile means extending from the rotatable member for moving the member in counterclockwise direction, to render the member inoperable when the brake pedal is depressed.

10. In a brake control device for a motor vehicle, the combination with a bracket mounted intermediate the brake and clutch pedals of said vehicle of a tensed limitable rotatable member on the bracket, catching means depressible with the brake, locking means extending from the rotatable member for normally engaging the catching and locking means, on the clutch pedal for normally reversing the movement of the rotatable member thereby disengaging the catching and locking means, and means extending from the edge of the rotatable member in communication with the dashboard of the vehicle, for actuating the rotatable member into counter-clockwise tensed position to render the same inoperable.

11. A brake control device for motor vehicles, a bracket provided with opposed extensions, means for supporting the bracket, a plurality of opposed independently slidable catching members each passable thru the extensions, a tensed rotatable member pivoted to the bracket intermediate the extensions, means extending from the rotatable member for engaging one of the catching members, the other of said means being adapted upon shifting the gears of the motor vehicle to disengage the first catching member, and means extending from the periphery of the rotatable member for maintaining said member in an inoperable condition.

12. Brake control apparatus for motor vehicles, comprising a bracket, means for supporting the bracket, a rotatable member mounted on the bracket, a slidable member adjacent the bracket, means extending from the rotatable member for engaging said member whereby to retain the same in locked position, tension means interconnecting the bracket and the rotatable member for retaining the latter in normal clockwise rotatable position, another slidable member for engaging said rotatable member and for actuating the same into counterclockwise position, and manually operable means extending from the rotatable member for preventing the slidable members to make a locking engagement.

CARMINE L. CALARCO.
GENE LEOFANTI.